(12) United States Patent  (10) Patent No.: US 8,621,347 B2
Kang  (45) Date of Patent: Dec. 31, 2013

(54) SYSTEM FOR PROVIDING A HANDLING INTERFACE

(75) Inventor: Sung Hyun Kang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 123 days.

(21) Appl. No.: 13/233,167

(22) Filed: Sep. 15, 2011

(65) Prior Publication Data

US 2012/0131505 A1  May 24, 2012

(30) Foreign Application Priority Data

Nov. 23, 2010 (KR) ........................ 10-2010-0116587

(51) Int. Cl.
   *G06F 17/00* (2006.01)
(52) U.S. Cl.
   USPC .......................................... 715/273; 715/700
(58) Field of Classification Search
   USPC ........................................................ 715/273
   See application file for complete search history.

(56) References Cited

U.S. PATENT DOCUMENTS

| | | | |
|---|---|---|---|
| 6,650,345 B1 | 11/2003 | Saito et al. | |
| 7,437,488 B2 * | 10/2008 | Ito et al. | 710/15 |
| 7,774,733 B2 * | 8/2010 | Seo et al. | 716/119 |
| 2004/0008188 A1 * | 1/2004 | Liu | 345/177 |
| 2007/0079155 A1 * | 4/2007 | Liao et al. | 713/300 |
| 2008/0320418 A1 * | 12/2008 | Huang et al. | 715/840 |
| 2009/0027330 A1 * | 1/2009 | Aida | 345/156 |
| 2009/0144622 A1 * | 6/2009 | Evans et al. | 715/706 |
| 2009/0235176 A1 * | 9/2009 | Jayanthi | 715/738 |
| 2010/0141606 A1 * | 6/2010 | Bae et al. | 345/174 |
| 2010/0302144 A1 * | 12/2010 | Burtner et al. | 345/157 |
| 2011/0012838 A1 * | 1/2011 | Pance et al. | 345/173 |
| 2011/0128446 A1 * | 6/2011 | Woo | 348/552 |
| 2011/0193781 A1 * | 8/2011 | Utsunomiya | 345/166 |
| 2012/0206378 A1 * | 8/2012 | Chen | 345/173 |
| 2013/0050131 A1 * | 2/2013 | Lee et al. | 345/174 |
| 2013/0063355 A1 * | 3/2013 | Truong | 345/163 |
| 2013/0116924 A1 * | 5/2013 | Ross et al. | 701/533 |

FOREIGN PATENT DOCUMENTS

| | | |
|---|---|---|
| JP | 2000-355256 A | 12/2000 |
| JP | U3076960 | 2/2001 |
| KR | 10-0162189 | 8/1998 |
| KR | 10-2001-0059258 | 7/2001 |
| KR | 10-2007-0035658 | 4/2007 |
| KR | 10-2010-0120767 | 11/2010 |

OTHER PUBLICATIONS

Gai et al., A Virtual Mouse System for Mobile Device, ACM 2005, pp. 127-131.*
Robertson et al., Virtual Mouse Vision Based Interface, ACM 2004, pp. 177-183.*

* cited by examiner

*Primary Examiner* — Cong-Lac Huynh
(74) *Attorney, Agent, or Firm* — Edwards Wildman Palmer LLP; Peter F. Corless

(57) ABSTRACT

This invention pertains to a system for providing a handling interface. More specifically, a display module for displaying the contents as images, and a control module for displaying a handling interface having a shape corresponding to a handling device is shown on the display module when an access signal is received from the handling device. The control module is also configured to perform a function displayed on the handling interface according to a signal from the handling device. In particular, the access signal represents the access of user's hand or a handling tool to the handling device, thereby allowing to user to more conveniently handle contents provided from a multimedia device in an automobile.

11 Claims, 5 Drawing Sheets

SYSTEM FOR PROVIDING A HANDLING INTERFACE

CROSS-REFERENCE TO RELATED APPLICATION

The priority of Korean patent application No. 10-2010-0116587 filed on Nov. 23, 2010, the disclosure of which is hereby incorporated in its entirety by reference, is claimed.

BACKGROUND OF THE INVENTION

This invention pertains to a system for providing a handling interface for a handling device such as mouse. Generally, it is very difficult to handle menus on a navigation screen using key buttons on the screen while driving an automobile. Thus, there is a need for a technique to display a handling interface having the same shape as a handling device such as mouse, joystick, etc. on the navigation screen, thereby allowing a driver to handle/control more conveniently contents provided by a multimedia device

BRIEF SUMMARY OF THE INVENTION

According to this invention, provided is a system for providing a handling interface, wherein the handling interface has a shape corresponding to a handling device such as mouse, joystick, etc., and contents can be conveniently handled/controlled using the handling interface on a screen.

More specifically, the system for providing a handling interface comprises a communication module for receiving particular contents, a display module for displaying the contents as images, and a control module for displaying a handling interface having a shape corresponding to a physical handling device in a vehicle through the display module when receiving an access signal from the handling device, and enabling the handling of the handling device through the handling interface. In particular, the access signal represents the access of user's hand or a handling tool to the handling device.

The communication module may be configured to receive particular contents from a multimedia device, and the control module may be configured to receive a pressing signal on a first button from a handling device, and may transmit an execution command signal to the multimedia device to display sequentially menu lists including sub-menus for the particular contents or other contents.

The communication module may receive particular contents from a multimedia device, and the control module may select any one of sub-menus among menu lists through any one of moving signals to front, back, left or right sides from a handling device and a pressing signal on a second button, and may transmit an execution command signal to the multimedia device to execute contents associated with the selected sub-menu. When a pressing signal is received, the control module may display or superimpose a predetermined icon on the screen of a button corresponding to the pressing signal in a handling interface, wherein the icon represents that the button is pressed.

The communication module may receive particular contents from a multimedia device, and the control module may receive a moving signal to front, back, left or right sides from a handling device, and may transmit an execution command signal to the multimedia device to move the screen of the contents to front, back, left or right sides according to the moving signal.

DESCRIPTION OF EMBODIMENTS

Hereinafter, exemplary embodiments of the present invention will be described referring to accompanying drawings in order for a person having ordinary skill in the art to which said subject matter pertains to easily carry out the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 1:
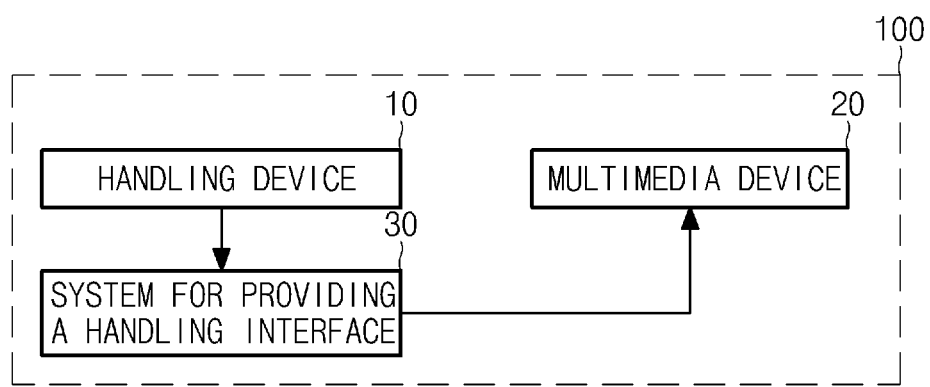
FIG. 1 is a schematic block diagram showing the entire configuration of a network for providing a handling interface according to this invention.

FIG. 1 is a schematic block diagram showing the entire configuration of network 100 for providing a handling interface according to this invention. As shown in FIG. 1, network 100 for providing a handling interface according to this invention includes a handling device 10, a multimedia device 20 and a system 30 for providing a handling interface.

The handling device 10 may have the same shape as normal mouse typically used for controlling a personal computer, and may produce a pressing signal and a scrolling signal according to user's handling and output these signals on the system 30 for providing a handling interface. Also, the handling device 10 may be configured to produce an access signal and output the access signal on the system 30 for providing a handling interface when user's hand or a handling tool is accessed within a certain distance.

A multimedia device 20 executes various contents under the control of the system 30 for providing a handling interface as described below. Once an access signal is received from the handling device 10, the system 30 for providing a handling interface displays a handling interface having a shape corresponding to the handling device 10 on a screen. Also, the system 30 for providing a handling interface controls the execution of contents provided by the multimedia device 20 by receiving a pressing signal on various buttons, a scrolling signal, etc., from the handling device 10.

Figure 2A:
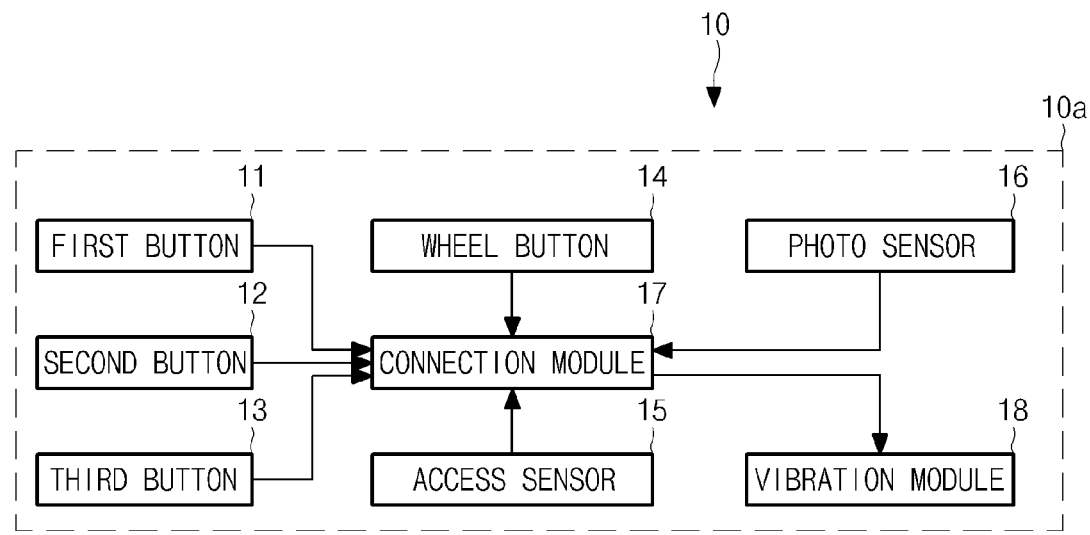
FIG. 2a is a schematic block diagram showing the configuration of a handling interface according to this invention.
Figure 2B:
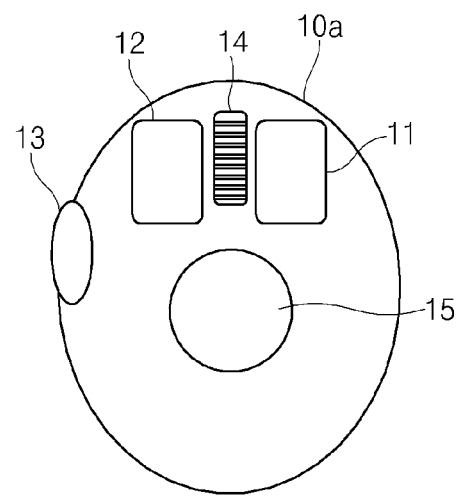
FIG. 2b is a plane view diagram showing the configuration of a handling interface according to this invention.

Hereinafter, the network 100 for providing a handling interface according to this invention will be described in detail with reference to individual components. FIG. 2a is a block view showing the configuration of the handling device 10 shown in FIG. 1 in more detail, and FIG. 2b is a view showing the appearance of the handling device 10 according to an embodiment of this invention. The handling device 10 includes a body 10a, a first button 11, a second button 12, a third button 13, a wheel button 14, an access sensor 15, a photo sensor 16, a connection module 17 and a vibration module 18.

The body 10a may have the same shape as normal mouse. For example, the body may have the shape shown in FIG. 2b. The first button 11 is positioned on one side (e.g. right side) of the front part of body 10a, and produces a pressing signal associated with the first button 11 when it is pressed by a user. The pressing signal associated with the first button 11 may be used as a signal to call out menu lists for contents.

The second button 12 is positioned on another side of the front part of body 10a, and produces a pressing signal associated with the second button 12 when it is pressed by user. The pressing signal associated with to the second button 12 may be used as a signal to select a particular item, such as a signal to select a particular sub-menu among menu lists for the current contents.

The third button 13 is positioned on the side part of body 10a, and produces a pressing signal associated with the third button 13 when it is pressed by user. The pressing signal associated with the third button 13 may be used as a signal to return (move) the current menu lists or sub-menus to menu lists or sub-menus in a previous step.

The wheel button 14 is positioned between the first button 11 and the second button 12, and produces a scrolling signal according to a particular rotating direction and amount when it is rotated by user. An access sensor 15 is positioned on the center of the front part of the body 10a. It produces an access signal when touched by an user's hand or a handling tool such as touch pen, and an access-releasing signal when the user's hand or handling tool is absent or kept apart from over a certain distance.

The photo sensor 16 is positioned on the back part of body 10a. This photo sensor 16 senses the movement of body 10a, and produces a moving signal in the moved direction. The connection module 17 performs a data communication with system 30 for providing a handling interface described below using any known communication protocol.

The vibration module 18 is configured to impart a force feedback, for example a vibration to body 10a when each of buttons, e.g., 11~14 are pressed, so that user can perceive whether a button has been normally pressed. That is, if any one of the first, second, third buttons 11~13 or wheel button 14 is handled (pressed or scrolled) by the user and a particular menu is normally selected, then the handled button is vibrated, so that user can perceive that the menu is normally selected.

Figure 3:
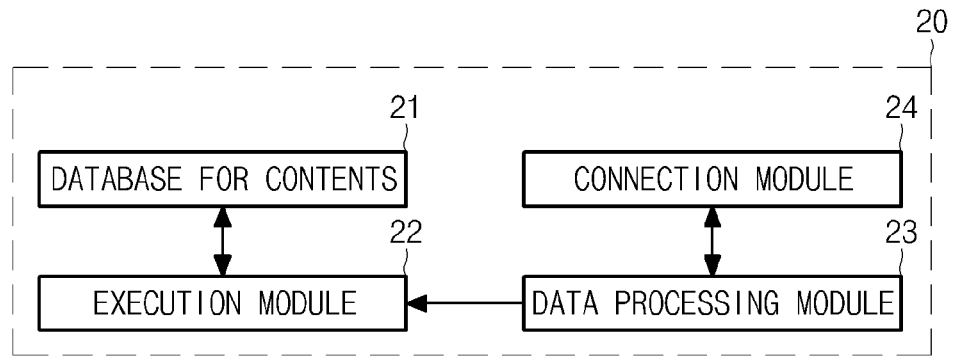
FIG. 3 is a schematic block diagram showing the configuration of a multimedia device according to this invention.

FIG. 3 is a schematic block diagram showing the configuration of multimedia device 20 according to this invention in more detail. Multimedia device 20 includes a database 21 for contents, an execution module 22, data processing module 23 and a connection module 24.

The database 21 stores menu lists associated with various contents and executing paths therefore. In addition, the database 21 stores contents associated with sub-menus for each contents or executing paths (files) therefore. Menu lists, for example, may include a playback mode for radio contents, a playback mode for DMB contents, a mode for navigation contents, a playback mode for multi-media files, a mode for mobile phone call, etc. In the case of the playback mode for radio or DMB contents, contents associated with sub-menus include contents to operate each channel of a radio or DMB or executing paths therefore. In the case of the mode for navigation contents, contents associated with sub-menus include contents to operate a map scale up/down function, a surrounding facilities information displaying function, a routing function, a point registering function, and a traffic information receiving function (TPEG) or executing paths therefore.

The execution module 22 is configured to execute contents or programs using these contents or executing paths (files/data containers) therefore. Data processing module 23 controls an operation to execute the particular contents in execution module 22 using an execution command signal for the particular contents that are being received from system 30 for providing a handling interface, as will be described below. Also, data processing module 23 extracts menu lists or sub-menus for particular contents from database 21 for contents according to a signal to request menu lists or sub-menus for the particular contents being received from system 30 for providing a handling interface, and transmits them to system 30 for providing a handling interface, as will be described below. Also, when a command signal to move the current menu lists or sub-menus to menu lists or sub-menus is received from system 30 for providing a handling interface, the data processing module 23 extracts menu lists or sub-menus associated with the previous step from the database 21, and transmits them to a system 30 for providing a handling interface. Also, when a command signal to move the screen of contents to the front, back, left or right sides is received from system 30 for providing a handling interface, the data processing module 23 controls an operation to execute the contents in the execution module 22 according to the signal. Also, when a command signal to scroll the screen of contents by a length corresponding to a rotating direction and an amount is received from system 30 for providing a handling interface, the data processing module 23 is configured to control an operation to execute the contents in the execution module 22 according to the signal. The connection module 24 performs a data communication with system 30 to provide a handling interface using any known communication protocol.

Figure 4:
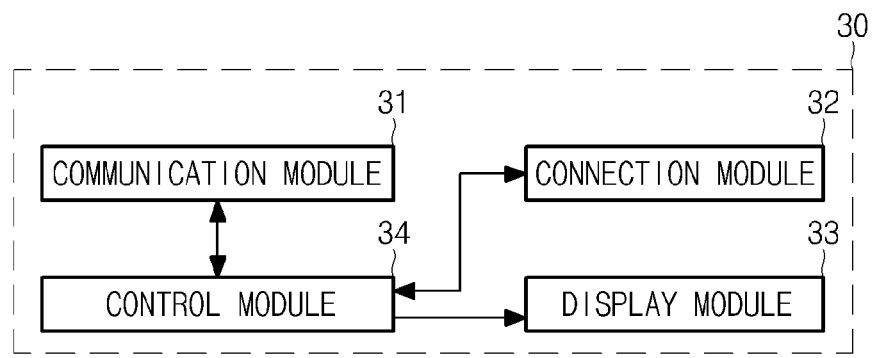
FIG. 4 is a schematic block diagram showing the configuration of a system for providing a handling interface according to this invention.

FIG. 4 is a schematic block diagram showing the configuration of system 30 for providing a handling interface according to this invention in more detail. The system 30 for providing a handling interface includes a communication module 31, a connection module 32, a display module 33 and a control module 34. The communication module 31 is configured to receive any one of a number of menu lists for particular contents or the execution of the contents, which are executed by multimedia device 20. The connection module 32 performs a data communication with handling device 10 using any known communication protocol and the display module 33 may be embodied as a liquid crystal display (LCD) configured to display a handling interface and contents on a screen.

Once an access signal representing the touch of a user's hand or a handling tool on the handling device 10 is received from the handling device 10, the control module 34 displays a handling interface having a shape corresponding to the handling device 10 via display module 33 on the display screen. In this case, the handling interface having a shape corresponding to handling device 10' means that the same or similar shape as the shape of handling device 10, e.g., the body 10a, the various buttons 11~13, and the wheel button 14 may be displayed on the display module 33 as virtual images (metaphor) as in FIG. 5 or 6. Also, when a pressing signal initiated on the first button 11 (it may be 'menu button') is received from handling device 10, control module 34 transmits a signal to request, for example, one or more menu lists for particular contents to the multimedia device 20, and displays the menu lists received from multimedia device 20 on the display module 33. Also, when a pressing signal initiated on the first button 11 is received again from handling device 10, control module 34 transmits a signal to request, for example, one or more menu lists for other contents to multimedia device 20, and displays the menu lists for other contents receiving from multimedia device 20 on the display module 33.

Figure 5:
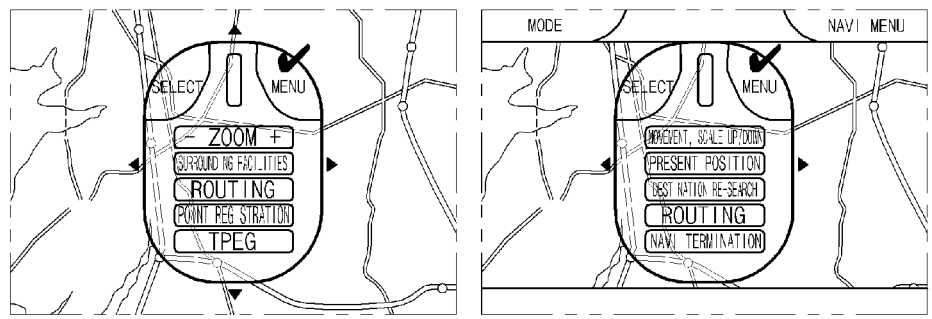
FIG. 5 is a illustrative view of the handling interface of the exemplary embodiment of the present invention.
Figure 6:
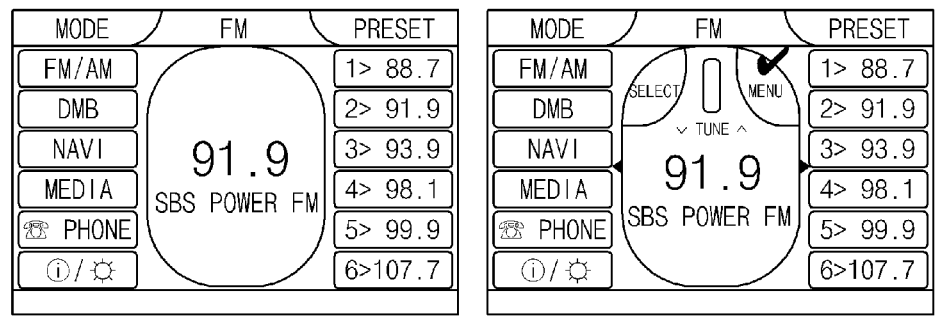
FIG. 6 is a illustrative view of the handling interface of the exemplary embodiment of the present invention.

In this case, the menu lists for particular contents or other contents may be displayed inside the handling interface having a shape corresponding to handling device 10 as in FIG. 5, or may be displayed outside the handling interface having a shape corresponding to handling device 10 as in FIG. 6 (zoom, surrounding facilities, routing, point registration, TPEG, FM/AM, DMB, NAVI, MEDIA, PHONE, etc.).

When an access-releasing signal representing that user's hand or a handling tool is absent or kept apart from handling device 10 over a certain distance is received from handling device 10, the control module 34 controls the display module 33 such that a handling interface is not displayed on a screen.

More specifically, the control module 34 selects any one of particular sub-menus (movement scale up/down, present position, destination re-search, routing, termination, etc. of 'routing' on menu lists, frequency lists for each channel of 'FM/AM' on menu lists) through any one of moving signals (e.g., the movement of a cursor between sub-menus on menu lists) to the front, back, left or right sides by a photo sensor 16 of handling device 10 and a pressing signal on the second button 12 (e.g., 'selecting button'), which is a command to select a particular sub-menu among menu lists. Then, the control module 34 produces a command signal to execute contents associated with the selected sub-menu, and transmits the signal to multimedia device 20.

When a pressing signal on the third button 13 is received from handling device 10, control module 34 transmits an execution command signal to multimedia device 20 to move the current menu lists or sub-menus to menu lists or sub-menus from the previous step. When a pressing signal on each button 11~13 is received, the control module 34 displays an icon on the screen of a button corresponding to the pressing signal in a handling interface. In this case, an icon represents that the button has been pressed. Thus, a user can easily handle the handling device 10 by viewing the handling interface displayed on the display module 33 without having to look at the actual handling device 10.

When a moving signal corresponding to the front, back, left or right sides is received from the handling device 10, control module 34 produces a command signal to move the screen of contents to the front, back, left or right sides according to the corresponding moving signal, and transmits the signal to multimedia device 20. When a scrolling signal corresponding to a certain direction and a rotating amount is received from handling device 10, the control module 34 produces a command signal to scroll the screen of contents by a length corresponding to the direction and the rotation amount, and transmits the signal to multimedia device 20.

Figure 7:
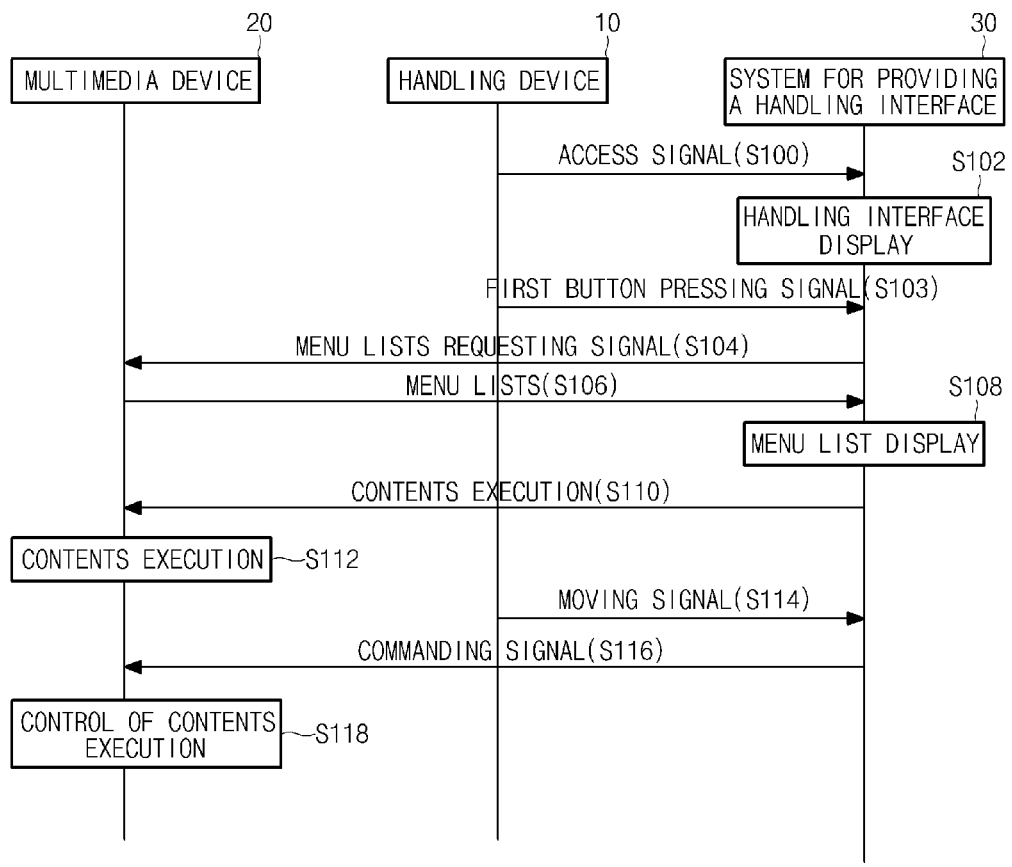
FIG. 7 is a flow chart showing the operations of a network for providing a handling interface according to this invention.

FIG. 7 is a flow chart showing the operations of a network 100 for providing a handling interface according to this invention.

Access sensor 15 of handling device 10 produces an access signal upon the control or touch by a user's hand or a handling tool within a certain distance, and outputs the signal on system 30 for providing a handling interface (S100). The control module 34 of system 30 for providing a handling interface displays a handling interface having a shape corresponding to the handling device 10 on display module 33 as in FIG. 5 or 6 when the access signal is received (S102).

Next, when a pressing signal on the first button 11 is received from handling device 10 (S103), the control module 34 of system 30 for providing a handling interface transmits a pre-determined signal corresponding to the pressing signal, for example, a signal to request menu lists of particular contents, to the multimedia device 20 (S104). Next, the data processing module 23 of the multimedia device 20 extracts one or more menu lists for the requested contents from the database 21, and transmits them to the system 30 for providing a handling interface (S106). The control module 34 of system 30 for providing a handling interface displays the received menu lists inside (see FIG. 5) or outside (see FIG. 6) the interface in the shape of for example a mouse or any other shape corresponding to the handling device (S108).

Next, when any one of moving signals corresponding to the front, back, left or right sides and a pressing signal on the second button 12, which is a command to select a particular sub-menus among the displayed menu lists, is received from the handling device 10, the control module 34 of the system 30 for providing a handling interface transmits an execution command signal to the multimedia device 20 to execute contents associated with the selected sub-menu (S110). Next, the execution module 22 of the multimedia device 20 executes contents using such contents or execution paths (files/data containers) therefore according to the command signal to execute contents (S112).

Next, when any one of moving signals to the front, back, left or right sides is received from the handling device 10 (S114), the control module 34 of the system 30 for providing a handling interface produces a command signal to move the screen of contents to the front, back, left or right sides according to the moving signal, and transmits the signal to multimedia device 20 (S116). The execution module 22 of the multimedia device 20 executes contents using such contents or execution paths (files) therefore according to the command signal to execute contents (S118).

Although this invention has been described with reference to configurations illustrated above and drawings, it should be understood that this invention is not limited to these configurations and drawings, and various variations and modifications may be made to this invention by one with ordinary skill in the art without departing the spirit and the scope of claims appended below.

What is claimed is:

1. A system for displaying a virtual representation of a handling device on a screen, wherein the system comprises:
    a display module for displaying contents as images on the screen, and
    a control module for displaying on the screen a handling interface having a shape corresponding to the handling device in response to receiving an access signal from the handling device, the control module further configured to perform a function displayed on the handling interface according to a signal from the handling device, wherein the access signal represents control of the handling device by the user's touch,
    wherein the handling device is a hardware device.

2. The system according to claim 1, wherein, when a first pressing signal on a first button is received from the handling device, the control module configured to produce an execution command signal to display menu lists which include a pre-set contents or sub-menus for the contents, and transmits the execution command to a multimedia device.

3. The system according to claim 2, wherein, when the first pressing signal is received, the control module displays an icon superimposed on the first button shown in the handling interface, the icon representing that the button is pressed.

4. The system according to claim 2, wherein the control module selects a particular sub-menu among the menu lists through a second pressing signal on a second button from the handling device, and wherein the control module produces an execution command signal to execute contents associated with the selected sub-menu, and transmits the execution command signal to the multimedia device.

5. The system according to claim 4, wherein, when the second pressing signal is received, the control module displays superimposes an icon on the position of the second button in the handling interface, the icon representing that the button is pressed.

6. The system according to claim 1, wherein, when any one of moving signals to a front, back, left or right side is received from the handling device, the control module transmitting an execution command signal to multimedia device to move the screen of the contents to the front, back, left or right side according to the moving signal.

7. A network for displaying a virtual representation of a handling device on a screen, wherein the network comprises:
 the handling device for producing and outputting an access signal initiated when a user operates the handling device, a pressing signal and a scrolling signal which are transmitted in response to a user's handling of the handling device, wherein the handling device is a hardware device;
 a multimedia device for storing contents and execution data, and executing contents according to an execution command signal and outputting the executed result; and
 a system for displaying on the screen a handling interface having a shape corresponding to the handling device in response to receiving the access signal from the handling device, producing the execution command signal according to the pressing signal and scrolling signal and transmitting the execution command to the multimedia device, and receiving the executed result from the multimedia device and displaying the result on the screen.

8. The network according to claim 7, wherein the handling device comprises:
 a first button configured to output a first pressing signal to call out menu lists for contents when the first button is pressed;
 a second button configured to output a second pressing signal to select sub-menus associated with the particular menu selected from the menu lists when the second button is pressed;
 a third button configured to output a third pressing signal to move the current menu lists or sub-menus to menu lists or sub-menus in a previous step;
 a wheel button configured to output a scrolling signal according to a rotating direction and amount when it is rotated;
 an access sensor configured to sense a user's hand or a handling tool touching the handling device; and
 a vibration module configured to impart vibration to a handled button when any one of the first, the second, the third buttons and the wheel button is handled and a menu is selected.

9. The network according to claim 8, wherein, when the access signal is received, the system for providing a handling interface displays, on a screen as the handling interface, images having a same shape as a body of the handling device and the first, the second, the third buttons and the wheel button formed on the body.

10. The network according to claim 8, wherein the system for providing a handling interface displays, on the screen as the handling interface, an image having the shape of computer mouse comprising an elliptical body;
 the first button formed on a right front part of the body; the second button formed on the left front part of the body, symmetrical to the first button; the wheel button formed between the first button and the second button; and the third button formed on a side part of the body.

11. The network according to claim 7, wherein the system for providing a handling interface displays the handling interface on a center part of the screen divided into three areas, and displays function modes for executing contents and sub-menus associated with a particular function mode on left and right parts of the handling interface, respectively.

\* \* \* \* \*